(12) United States Patent
Bhushan et al.

(10) Patent No.: US 8,137,751 B2
(45) Date of Patent: Mar. 20, 2012

(54) HIERARCHICAL STRUCTURES FOR SUPERHYDROPHOBIC SURFACES AND METHODS OF MAKING

(75) Inventors: Bharat Bhushan, Powell, OH (US); Yong Chae Jung, Columbus, OH (US); Michael Nosonovsky, Kew Gardens, NY (US)

(73) Assignee: The Ohio State University, Columbus, OH (US)

( * ) Notice: Subject to any disclaimer, the term of this patent is extended or adjusted under 35 U.S.C. 154(b) by 0 days.

(21) Appl. No.: 13/078,296

(22) Filed: Apr. 1, 2011

(65) Prior Publication Data
US 2011/0177288 A1     Jul. 21, 2011

Related U.S. Application Data

(62) Division of application No. 12/234,900, filed on Sep. 22, 2008.

(60) Provisional application No. 61/085,589, filed on Aug. 1, 2008.

(51) Int. Cl.
*B05D 1/36* (2006.01)

(52) U.S. Cl. ........ 427/265; 428/141; 428/172; 427/256; 427/258; 427/287; 264/225; 264/400

(58) Field of Classification Search .............. 427/256, 427/258, 265, 287; 428/141, 172; 264/225, 264/400
See application file for complete search history.

(56) References Cited

U.S. PATENT DOCUMENTS

| | | | |
|---|---|---|---|
| 6,280,834 B1 | 8/2001 | Veerasamy et al. | |
| 6,284,377 B1 | 9/2001 | Veerasamy | |
| 6,338,901 B1 | 1/2002 | Veerasamy | |
| 6,350,397 B1 | 2/2002 | Heikkila et al. | |
| 6,479,216 B1 | 11/2002 | Vermeersch et al. | |
| 6,491,987 B2 | 12/2002 | Veerasamy | |
| 6,660,363 B1 | 12/2003 | Barthlott | |
| 6,689,476 B2 | 2/2004 | Veerasamy et al. | |
| 6,743,467 B1 | 6/2004 | Jones et al. | |
| 6,743,516 B2 | 6/2004 | Murphy et al. | |
| 6,800,354 B2 | 10/2004 | Baumann et al. | |
| 6,858,284 B2 | 2/2005 | Nun et al. | |
| 6,923,216 B2 | 8/2005 | Extrand et al. | |
| 2002/0055556 A1* | 5/2002 | Schubert et al. .............. 523/216 |
| 2002/0133129 A1* | 9/2002 | Arias et al. ..................... 604/272 |
| 2003/0152780 A1 | 8/2003 | Baumann et al. | |
| 2004/0067339 A1 | 4/2004 | Gandon et al. | |
| 2005/0008876 A1 | 1/2005 | Teranishi | |
| 2006/0029808 A1 | 2/2006 | Zhai et al. | |

(Continued)

OTHER PUBLICATIONS

Ensikat et al., Crystallinity of plant epicuticular waxes: electron and X-ray diffraction studies, Jul. 10, 2006, Chemistry and Physics of Lipids, 144(2006)45-59.*

(Continued)

*Primary Examiner* — Frederick Parker
*Assistant Examiner* — Xiao Zhao
(74) *Attorney, Agent, or Firm* — Dinsmore & Shohl LLP

(57) ABSTRACT

Embodiments of methods of making superhydrophobic structures comprise depositing a polymer mold onto a silicon surface comprising a plurality of microasperities, removing the polymer mold after the polymer mold has hardened, depositing a liquid epoxy resin into the polymer mold, forming a microstructure with a plurality of microasperities by separating the epoxy resin from the mold after the epoxy resin has solidified, and forming a superhydrophobic structure by depositing a plurality of alkane nanoasperities on the microstructure in the presence of solvent vapor.

16 Claims, 12 Drawing Sheets

U.S. PATENT DOCUMENTS

2006/0078724 A1     4/2006     Bhushan et al.
2006/0115623 A1     6/2006     Aizenberg et al.

OTHER PUBLICATIONS

Baumann, M et al.; Leaning From the Lotus Flower—Selfcleaning Coatings on Glass; Glass Processing Days 2003; p. 330-333.

Takahashi, K et al.; Simple Fabrication of Hydrophobic Surface for High-Temperature Microsystems; 7th International Conference on Miniaturized Chemical and Biochemical Analysis Systems; Oct. 5-9, 2003; p. 503-506; Squaw Valley, California.

Duparre, A et al.; Design and characterization of optical coatings with enhanced roughness for ultra-hydrophobic, low scatter applications; Fraunhofer IOF Annual Report 2001; p. 38-39.

Schlotter, N et al.; Surface Topology and Chemical Parameters Controlling Superhydrophobicity Studied by Contact Angle Measurements; SP-Web-SHORT.doc; p. 1-4.

Kim, J et al.; Nanostructured Surfaces for Dramatic Reduction of Flow Resistance in Droplet-Based Microfluidics; 2002 IEEE; p. 479-482.

Klein, R et al.; Producing Super-Hydrophobic Surfaces with Nano-Silica Spheres; p. 1-12.

Bhushan, B et al.; Mirco- and nanoscale characterization of hydrophobic and hydrophilic leaf surfaces; Nanotechnology; May 16, 2006; 2758-2772.

McHale, M et al.; Electrowetting on super-hydrophobic surfaces; A. Physical; 2006; Elsevier.

Nosonovsky, M et al.; Comprehensive analytical model for biomimetic superhydrophobic surfaces; Sep. 17, 2004; p. 1-30, 33.

Nosonovsky, M et al.; Roughness optimization for biomimetic superhydrophobic surfaces; Nov. 14, 2004; p. 1-49.

Nosonovsky, M et al; Stochastic model for metastable wetting of roughness-induced superhydrophobic surfaces; Dec. 28, 2004; p. 1-22.

Office Action pertaining to U.S. Appl. No. 12/234,900 dated Apr. 25, 2011.

* cited by examiner

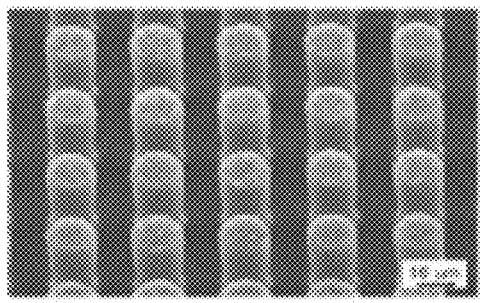
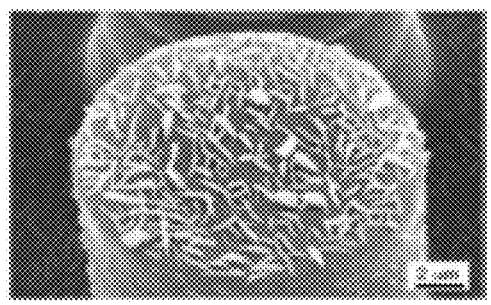
FIG. 3A          FIG. 3B
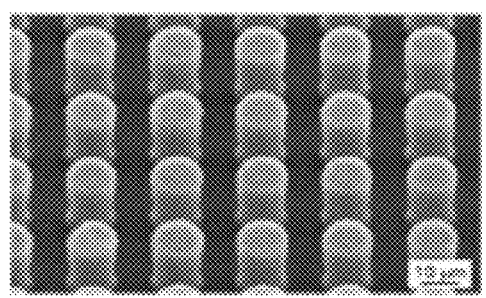
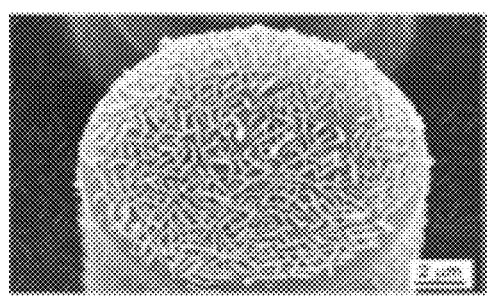
FIG. 4A          FIG. 4B
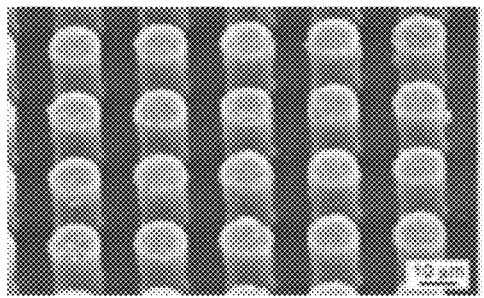
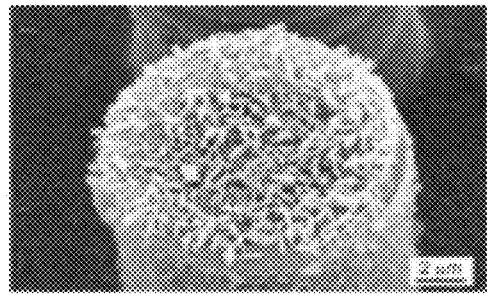
FIG. 5A          FIG. 5B

TRANSITION →

HIERARCHICAL STRUCTURES FOR SUPERHYDROPHOBIC SURFACES AND METHODS OF MAKING

CROSS-REFERENCE TO RELATED APPLICATIONS

This application is a division of U.S. patent application Ser. No. 12/234,900, filed Sep. 22, 2008 which claims the benefit of U.S. Provisional Application Ser. No. 61/085,589 filed Aug. 1, 2008. The entire contents of said application are incorporated herein by reference in its entirety.

BACKGROUND

The present invention relates generally to superhydrophobic surfaces, and relates specifically to hierarchical structures comprising microstructures and nanostructures.

SUMMARY

Advances in nanotechnology, including micro/nanoelectromechanical systems (MEMS/NEMS), have stimulated the development of new materials, for example, hydrophobic materials. Embodiments of the present invention generally relate to superhydrophobic hierarchical structures which comprise microstructures and nanostructures, and methods of fabricating these structures. The structure of the invention is modeled from structures found in nature, such as *Nelumbo nucifera* (lotus). A lotus leaf is superhydrophobic due to the intrinsic hierarchical structure, built by convex cell papillae and randomly oriented hydrophobic wax tubules, which have high contact angles with water and show strong self-cleaning properties.

Hierarchical structures can provide non-adhesive and water repellent properties similar to a lotus leaf. As used herein, superhydrophobicity is the ability of a surface to have a very high water contact angle, and low contact angle hysteresis. Hysteresis is the difference between the advancing contact angle and the receding contact angle. To achieve high static contact angle along with low contact angle hysteresis, superhydrophobic surfaces should form a composite interface with air pockets. Several factors can destroy the composite interface. First, the capillary waves at the liquid-air interface may destabilize the composite interface. The effect of capillary waves is more pronounced for small asperities with height comparable with wave amplitude. Second, nanodroplets may condense and accumulate in the valleys between asperities and destroy the composite interface. Third, even hydrophobic surfaces are usually not chemically homogeneous and can have hydrophilic spots.

To prevent destabilization of the composite interface, a superhydrophobic structure comprising a substrate and a hierarchical surface structure disposed on at least one surface of the substrate may be utilized. The hierarchical structure prevents destabilization of the composite interface and enlarges the liquid-air interface thereby producing a high contact angle and a low contact angle hysteresis. The microstructure of the hierarchical structure resists capillary waves present at the liquid-air interface, while nanostructures of the hierarchical structure prevent nanodroplets from filling the valleys between asperities.

The ability of a water drop to bounce off a surface constitutes another benefit. This property is naturally related to the first two properties, since the energy barriers separating between the "sticky" and "non-sticky" states needed for bouncing drops have the same origin as those needed for high contact angle and low contact angle hysteresis. In some cases, droplets may bounce off a superhydrophobic surface in an almost elastic manner. The kinetic energy of the drop is stored in the surface deformation during the impact. A deformed drop has a higher surface area and thus higher surface free energy. Therefore, during the impact when the drop is deformed, it can accommodate more kinetic energy.

Moreover, the hierarchical structures may be used in various applications, including self cleaning windows, windshields, exterior paints for buildings, navigation ships, utensils, roof tiles, textiles and reduction of drag in fluid flow, e.g., in micro/nanochannels. It can also benefit application such as adhesive tape, fasteners, toys, wall climbing robots, space (microgravity) applications, and MEMS assembly with high adhesive properties. Additional applications include the reduction of the capillary meniscus force by introducing roughness in the stable Cassie regime, utilizing the possibilities of energy conversion and microscale capillary engines provided by the reversible superhydrophobicity, and creating superoleophobic surfaces for fuel economy.

According to one embodiment of the present invention, a superhydrophobic structure is provided. The superhydrophobic structure comprises a substrate and a hierarchical surface structure disposed on at least one surface of the substrate. The hierarchical surface structure comprises a microstructure comprising a plurality of microasperities disposed in a spaced geometric pattern on at least one surface of the substrate, wherein the fraction of the surface area of the substrate covered by the microasperities is from between about 0.1 to about 1. The hierarchical surface structure further comprises a nanostructure comprising a plurality of nanoasperities disposed on at least one surface of the microstructure.

According to another embodiment of the present invention, a method of making hierarchical structures comprising depositing a polymer mold onto a silicon surface comprising a plurality of microasperities, removing the polymer mold after the polymer mold has hardened, depositing a liquid epoxy resin into the polymer mold, forming a microstructure with a plurality of microasperities by separating the epoxy resin from the mold after the epoxy resin has solidified, and forming a nanostructure by depositing alkanes on the microstructure in the presence of solvent vapor.

These and additional features and advantages provided by the embodiments of the present invention will be more fully understood in view of the following detailed description, the accompanying drawings, and the appended claims.

BRIEF DESCRIPTION OF THE DRAWINGS

The following detailed description of specific embodiments of the present invention can be best understood when read in conjunction with the drawings enclosed herewith and where like elements are identified by like reference numbers in the several provided views.

FIG. 3A is an SEM image illustrating a hierarchical structure comprising microasperities and nanoasperities (0.12 µg/mm$^2$ mass of n-hexatriacontane) disposed thereon according to one or more embodiments of the present invention;

FIG. 3B is an SEM image providing an enlarged view of one of hierarchical structures of FIG. 3A according to one or more embodiments of the present invention.

FIG. 4A is an SEM image illustrating a hierarchical structure comprising microasperities and nanoasperities (0.2 µg/mm$^2$ mass of n-hexatriacontane) disposed thereon according to one or more embodiments of the present invention;

FIG. 4B is an SEM image providing an enlarged view of one of hierarchical structures of FIG. 4A according to one or more embodiments of the present invention.

FIG. 5A is an SEM image illustrating a hierarchical structure comprising microasperities and nanoasperities (0.4 µg/mm$^2$ mass of n-hexatriacontane) disposed thereon according to one or more embodiments of the present invention;

FIG. 5B is an SEM image providing an enlarged view of one of hierarchical structures of FIG. 5A according to one or more embodiments of the present invention;

Figure 1:
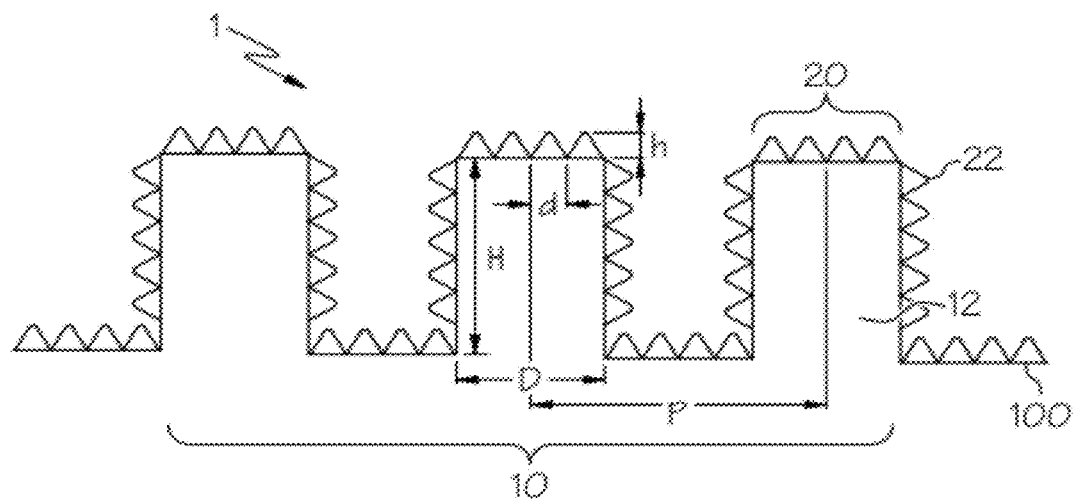
FIG. 1 is a schematic view illustrating a hierarchical structure comprising microasperities in the shape of circular pillars with diameter D, height H, and pitch P, and pyramidal shaped nanoasperities of height h and diameter d with rounded tops according to one or more embodiments of the present invention.

The embodiments set forth in the drawings are illustrative in nature and not intended to be limiting of the invention defined by the claims. Moreover, individual features of the drawings and invention will be more fully apparent and understood in view of the detailed description.

DETAILED DESCRIPTION

Referring generally to the embodiment of FIG. 1, a hierarchical surface 1 may comprise a microstructure 10 comprising a plurality of microasperities 12 disposed in a geometric pattern on at least one surface of a substrate 100, and a nanostructure 20 disposed on at least one surface of the microstructure 10. The microasperities 12 should be high enough so that a droplet does not touch the valleys between adjacent microasperities 12. In the embodiment of FIG. 1, the microasperities 12 may comprise a height H of between about 1 to about 100 µm and a diameter D of between about 1 to about 50 µm, wherein the fraction of the surface area of the substrate 100 covered by the microasperities 12 may range from between about 0.1 to about 1. In further embodiments, the fraction of the surface area of the substrate covered by the microasperities is from between about 0.5 to about 1, or from about 0.8 to about 1.0.

Figure 2A:
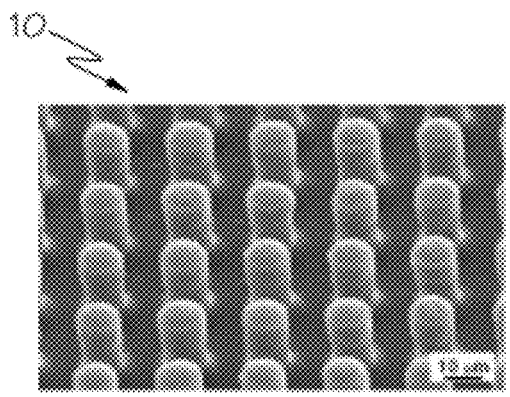
FIG. 2A is a scanning electron micrograph (SEM) image illustrating a plurality of microasperities according to one or more embodiments of the present invention.
Figure 2B:
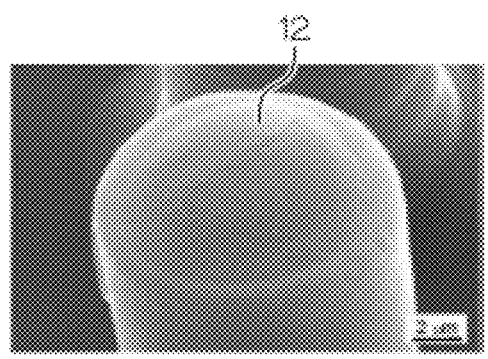
FIG. 2B is an SEM image providing an enlarged view of one of the plurality of microasperities shown in FIG. 2A according to one or more embodiments of the present invention.
Figure 6A:
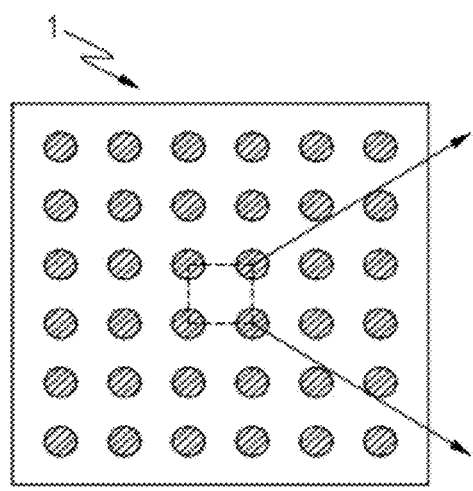
FIGS. 6A and 6B are schematic views illustrating a geometrical arrangement of microasperities on a substrate, specifically highlighting the pitch P between adjacent microasperities, according to one or more embodiments of the present invention.
Figure 6B:
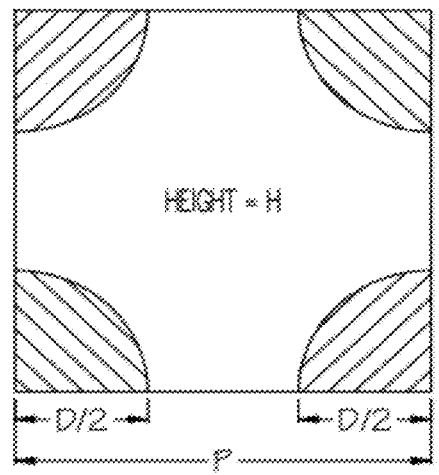

Further as shown in FIGS. 1, 6A, and 6B, the pitch P between adjacent microasperities may range from between about 1 and about 500 µm. The SEM image of FIG. 2A, which only illustrates microstructures, provides an example of a geometric arrangement of microasperities 12 on a substrate. Although the present disclosure emphasizes geometrically arranged microasperities 12, it is contemplated that alternative arrangements may be desirable, e.g., random patterns of microasperities 12. Moreover, although the microasperities illustrated in FIGS. 3B through 5B are cylindrical with a rounded top, numerous other shapes of microasperities are contemplated herein. For additional embodiments of asperity shapes, U.S. Publication No. U.S. 20060078724 entitled Hydrophobic Surface with Geometric Roughness Pattern is incorporated by reference herein in its entirety.

Referring again to FIG. 1, the nanostructure 20 of the hierarchical surface 1 may comprise a plurality of nanoasperities 22 disposed on at least one surface of the microstructure 10. As shown, the plurality of nanoasperities 22 may be disposed on the microasperities 12, on the substrate 100 in the spacing between adjacent microasperities 12, or combinations thereof. Furthermore, the nanoasperities 22 may comprise a height h of between about 1 to about 100 nm and a diameter d of between about 1 to about 300 nm. In further embodiments, the plurality of nanoasperities 22 may be arranged randomly as shown in FIGS. 3B, 4B, and 5B, whereas the schematic illustration of FIG. 1 shows the nanoasperities 22 arranged in a geometric pattern. Combinations of geometric and random patterns of nanoasperities 22 are contemplated herein. Like the microasperities 12, the nanoasperities 22 may comprise various asperity shapes as disclosed in U.S. Publication No. U.S. 20060078724 incorporated by reference herein in its entirety. For example, in the embodiment of FIG. 1, the nanoasperities 12 may comprise pyramidal pillars with rounded tops.

As shown generally in the figures, various arrangements are contemplated for the hierarchical structures and the nanoasperities and microasperities thereon. As described above and as shown in FIGS. 3A-5B, the microasperities 12 may comprise circular pillars. In a specific embodiment, the circular pillar microstructure may achieve a composite interface defined by the following relation $(\sqrt{2}P-D)^2/R<H$. In accordance with the relation and as illustrated in FIG. 1, a droplet with a radius R on the order of 1 mm or larger, a microasperity height H on the order of 30 µm, a microasperity diameter D on the order of 15 µm, a pitch P between microasperities on the order of 130 µm may be optimum.

Referring again to FIG. 1, the nanoasperities 22 may pin the liquid-air interface and thus prevent liquid from filling the valleys between microasperities 12. The nanoasperities 22 may also support nanodroplets, which may condense in the valleys between microasperities 12, especially larger microasperities 12. Therefore, nanoasperities 22 should have a small pitch to handle nanodroplets having a size less than about 100 nm to about 1 nm radius. The nanoasperities 22 should be high enough so that a droplet does not touch the valleys between adjacent nanoasperities 22. For example, the nanoasperities 22 may comprise a height h of about 5 to about 50 nm, or about 10 to about 20 nm. Additionally, the nanoasperities 22 may comprise a diameter d of up to about 100 nm, or between about 50 to about 100 nm.

Various materials are contemplated for use in the microasperities and nanoasperities of the hierarchical structure. The microasperities may include suitable inorganic or organic materials operable suitable to support a droplet. For example and not by way of limitation, the microasperities may comprise epoxy resin, a silicon based resin, or combinations thereof. As stated above, the nanoasperities are fabricated with the goal of mimicking the structure of a lotus leaf. Consequently, the nanoasperities may include hydrophobic compositions, for example, and not by way of limitation, hydrophobic alkanes. The hydrophobic alkanes may include tropaeolum wax (*Tropaeolum majus*), leymus wax (*Leymus arenarius*), n-hexatriacontane, or combinations thereof. Referring to the embodiments illustrated in the SEM images of FIGS. 3B, 4B, and 5B, nanoasperities may comprise three-dimensional platelets of n-hexatriacontane with three different nanoasperity surfaces having 0.12 µg/mm$^2$, 0.2 µg/mm$^2$, and 0.4 µg/mm$^2$ masses, respectively. Platelets are flat crystals grown perpendicular to the surface of the microasperities. In one embodiment, the platelet thickness may vary between 50 and 100 nm, whereas their length varies between 500 and 1000 nm. Various other nanostructures may be produced by changing the crystal density of the three-dimensional alkane crystals.

As detailed above, the performance of the superhydrophobic hierarchical structure may be quantified through the static contact angle and contact angle hysteresis metrics. The hierarchical surface structure is operable to achieve a static contact angle with a liquid of between about 150° to about 180°, and a contact angle hysteresis of between about 0° to about 10°. The contact angle hysteresis is the difference between the advancing contact angle and receding contact angle. In specific embodiments, the superhydrophobic structure may comprise a static contact angle of between about 165° to about 180°, and a contact angle hysteresis of between about 0° to about 5°.

Various methods of fabricating hierarchical structures are contemplated herein. One such method is the production of microstructures using surface structure replication and the subsequent production of nanoasperities via the self-assembly of hydrophobic alkanes. A number of superhydrophobic surfaces have been fabricated with hierarchical structures using molding, electrodeposition, nanolithography, colloidal systems and photolithography. Molding is low cost and reliable way of surface structure replication and can provide a precision on the order of 10 nm. Self-assembly of the nanostructures may be achieved via various methods familiar to one of ordinary skill in the art, for example, thermal deposition and/or evaporation processes.

In one embodiment, a method of making hierarchical structures comprises the steps of depositing a polymer mold onto a silicon surface comprising a plurality of microasperities, removing the polymer mold after the polymer mold has hardened, depositing a resin, for example, a liquid epoxy resin into the polymer mold, and forming a microstructure with a plurality of microasperities by separating the epoxy resin from the mold after the epoxy resin has solidified.

The method further includes the steps of forming nanoasperities by depositing alkanes such as n-hexatriacontane or alkanes of plant waxes (e.g. *leymus* and *tropaeolum*) on the microstructure optionally in the presence of solvent vapors such as ethanol and chloroform. The following examples are experimental examples in accordance with embodiments of the present invention

EXAMPLES

Example 1

A two-step molding process was used to fabricate the microstructure on a substrate surface, in which at first a negative mold is generated and then a positive mold. As a master template, a Si surface with pillars of 14 pm diameter and 30 pm height with 23 pm pitch, fabricated by photolithography was used. A polyvinylsiloxane dental wax (e.g. President Light Body® Gel manufactured by Coltene Whaledent) was applied via a dispenser on the surface and immediately pressed down with the cap of a Petri dish or with a glass plate. After complete hardening of the molding mass (at room temperature for approximately 5 minutes), the silicon master surface and the mold (negative) were separated. After a relaxation time of 30 minutes for the molding material, the negative replicas were filled up with a liquid epoxy resin (e.g., Epoxydharz L® manufactured by Conrad Electronics) with hardener (e.g., Harter S, Nr 236365 manufactured by Conrad Electronics). The liquid epoxy resin was added near the edge of the negative replica to prevent trapped air. Specimens were immediately transferred to a vacuum chamber at 750 mTorr (100 Pa) pressure for 10 seconds to remove trapped air and to increase the resin infiltration through the structures. After hardening at room temperature (24 h at 22° C., or 3 h at 50° C.), the positives replica were separated from the negative replica. The second step can be repeated to generate a number of replicas.

The nanostructure was created by self assembly of the *Tropaeolum* and *Leymus* waxes, which were deposited by thermal evaporation. These waxes are provided by Botanical Garden of the University of Bonn. The specimens of smooth surfaces and microstructure replicas were placed in a vacuum chamber at 30 mTorr (4 kPa pressure), 2 cm above a hot plate loaded with 500, 1000, 1500 and 2000 µg waxes. The waxes were evaporated by heating it up to 120° C. Evaporation from the point source to the substrate occurs over a hemispherical region. In order to estimate the amount of sublimated mass, the surface area of the half sphere is first calculated using the formula $2\pi r^2$, whereby the radius (r) represents the distance between the specimen to be covered and the heating metal with the substance to be evaporated. Next, the amount of sublimated mass per surface area can be calculated by an amount of alkane loaded on a hot plate divided by surface area. After coating, the specimens were placed in a glass crystallization chamber with ethanol or chloroform solution to increase molecule mobility for recrystallization and then placed in the oven at 500 C for 3 days. The chamber should be opened to prevent the condensation of water inside. After that, the specimens were placed in a desiccator at room temperature for 4 days for crystallization of the alkanes.

Example 2

Figure 7A:
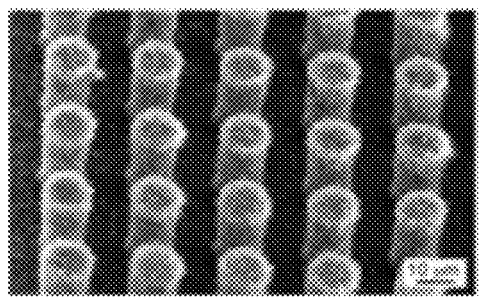
FIG. 7A is an SEM image illustrating a hierarchical structure with a plurality of nanoasperities comprising *tropaeolum* tubules, which were formed on the microstructure by deposition in the presence of ethanol vapor according to one or more embodiments of the present invention.
Figure 7B:
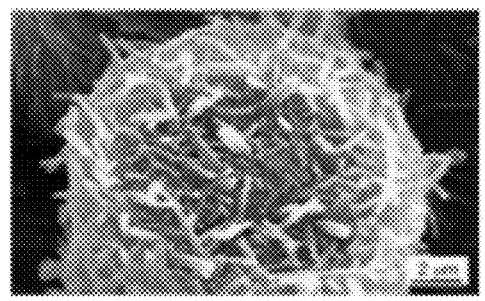
FIG. 7B is an SEM image provides an enlarged view of one of the plurality of hierarchical structures shown in FIG. 7A according to one or more embodiments of the present invention.
Figure 8A:
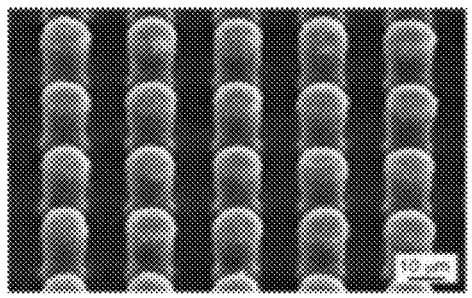
FIG. 8A, in contrast to FIG. 7A, is an SEM image illustrating a hierarchical structure with a plurality of nanoasperities comprising *tropaeolum* tubules, which were formed on the microstructure by deposition without ethanol vapor according to one or more embodiments of the present invention.
Figure 8B:
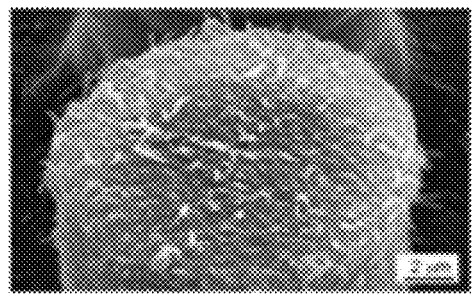
FIG. 8B is an SEM image provides an enlarged view of one of the plurality of hierarchical structures shown in FIG. 8A according to one or more embodiments of the present invention.

For nanostructures of *Tropaeolum* wax, two different experimental conditions, after storage at 50° C. with and without ethanol vapor, were used to identify optimized structures. FIGS. 7A and 7B is an SEM micrograph illustrating a hierarchical structure fabricated with 0.8 µg/mm² of *Tropaeolum* wax after storage at 50° C. with ethanol vapor, whereas FIGS. 8A and 8B illustrate a hierarchical structure fabricated with 0.8 µg/mm² of *Tropaeolum* wax after storage at 50° C. without ethanol vapor. When comparing the SEM images of FIG. 7B to 8B, the presence of ethanol vapor yields an increase in tubules on flat and microstructure surfaces after deposition of *tropaeolum* wax. The formation of tubules requires mobility of wax molecules on the surface, which is provided at least in part by the solvent (e.g., the ethanol vapor).

Example 3

Figure 9A:
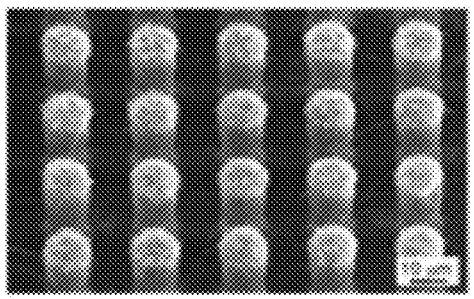
FIG. 9A is an SEM image illustrating a hierarchical structure with a plurality of nanoasperities comprising *leymus* wax tubules, which were formed on the microstructure by deposition with chloroform according to one or more embodiments of the present invention.
Figure 9B:
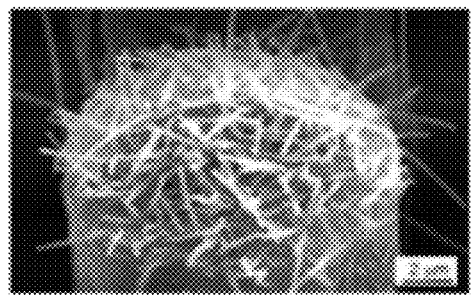
FIG. 9B is an SEM image provides an enlarged view of one of the plurality of hierarchical structures shown in FIG. 9A according to one or more embodiments of the present invention.
Figures 10A, 10B, 10C:
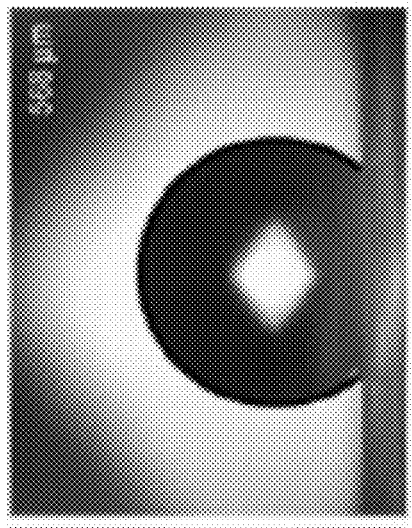
FIG. 10A through 10F are successive SEM photographs taken at 60 second intervals which illustrates the evaporation of a droplet on a surface with only microasperities.
Figures 10D, 10E, 10F:
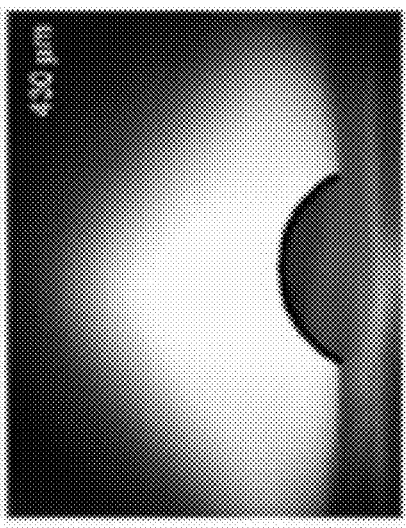
Figure 11A:
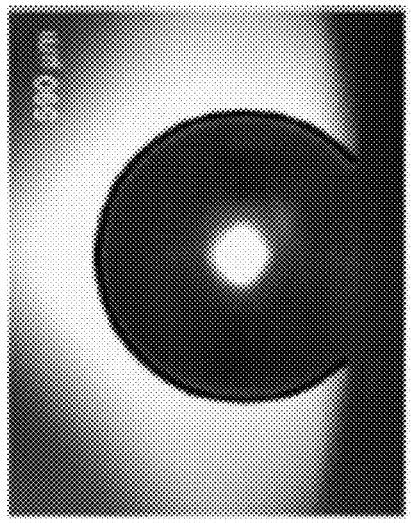
FIG. 11A through 11F, in contrast to FIGS. 10A through 10F, are successive SEM photographs taken at 60 second intervals which illustrates the evaporation of a droplet on a surface with a hierarchical structure according to one or more embodiments of the present invention.
Figure 11B:
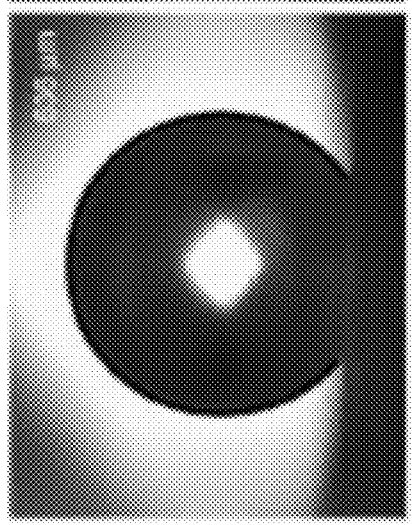
Figure 11C:
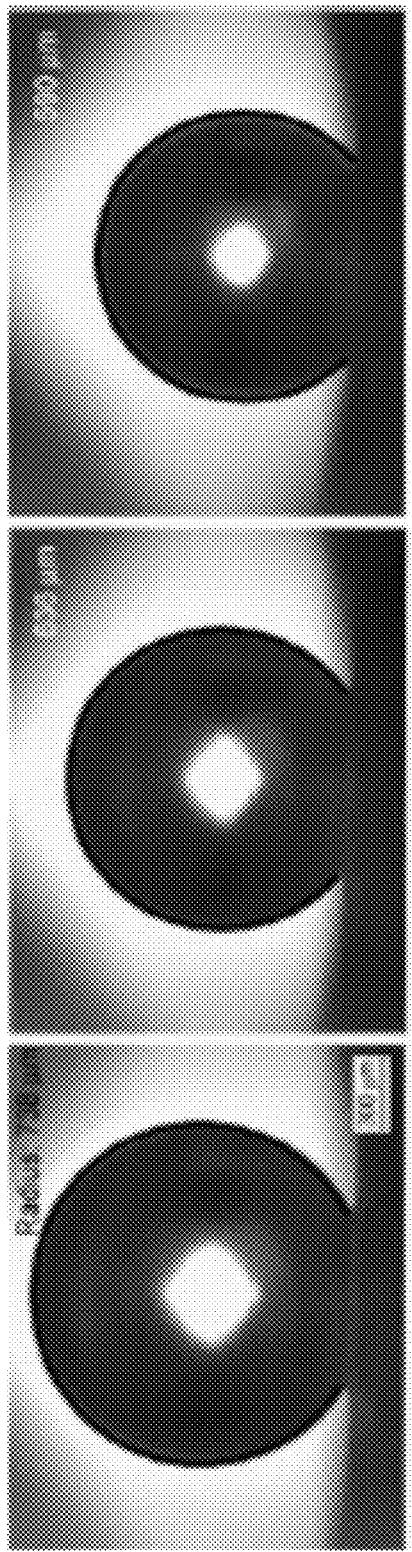
Figure 11D:
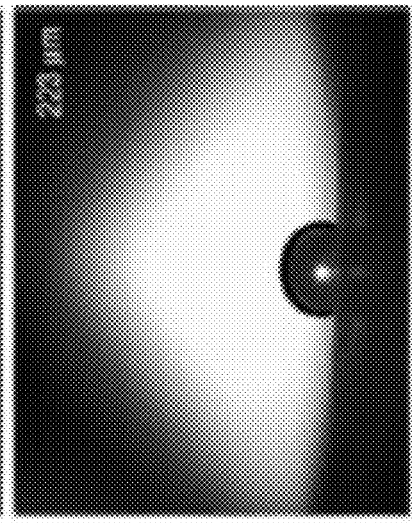
Figure 11E:
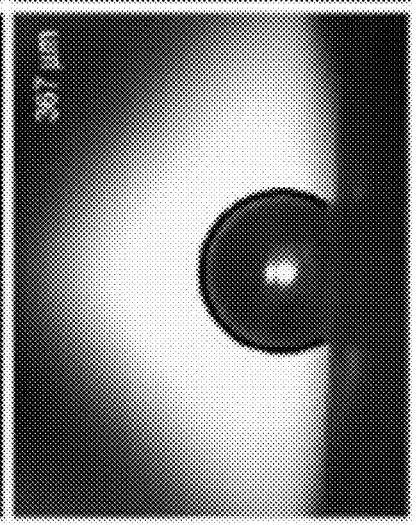
Figure 11F:
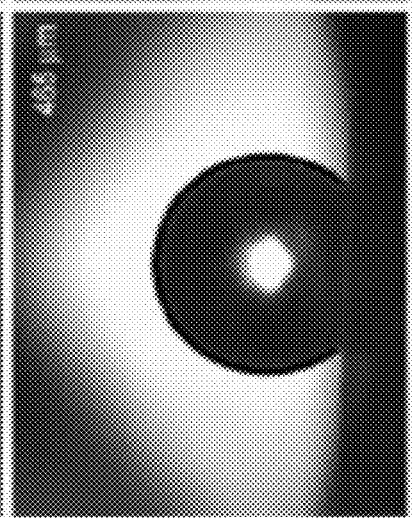

Unlike *Tropaeolum* wax as described in Example 2, crystal growth of *Leymus* wax was not found on the surface after storage at 50° C. with ethanol vapor. However, chloroform solution yielded increased molecule mobility, and thus increased mobility of *Leymus* wax. FIGS. 9A and 9B are SEM images illustrating the hierarchical structure fabricated with a mass of 0.8 µg/mm² of *Leymus* wax after storage at 50° C. with chloroform vapor. An increase in tubule length was found after deposition of higher wax mass. The higher mass of deposited wax led to an increase in the amount of tubules with a more up right orientation. The tubular crystals were randomly orientated on the surface and embedded into an amorphous wax layer, and may be two to five times longer than the tubules of *Tropaeolum* wax. For example, the *leymus* wax tubules may comprise a tubular diameter of may vary between about 200 to about 300 nm, and a length between about 1500 to about 4000 nm.

Example 4

Figure 14A:
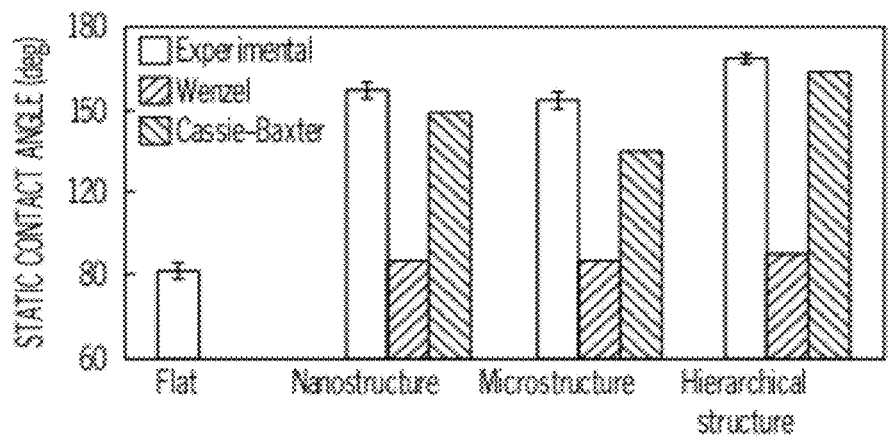
FIG. 14A is a graphical illustration comparing the superhydrophobicity of a flat structure, a nanostructure, a microstructure, and a hierarchical structure based on static contact angle according to one or more embodiments of the present invention.

To study the effect of structure on superhydrophobicity, the following metrics (static contact angle, contact angle hysteresis, and tilt angle, and adhesive forces) were used to evaluate four structures as illustrated in the graphs of FIGS. 14A-14D. The first structure i.e., the flat refers to a flat surface coated with a film of *Tropaeolum* wax. The second structure i.e., the nanostructure refers to a flat surface with a nanostructure of 0.8 µg/mm² mass *Tropaeolum* wax tubules. The microstructure and hierarchical structures are the third and fourth structures, wherein the hierarchical structure includes a nanostructure of 0.8 µg/mm² mass *Tropaeolum* wax tubules. As shown in FIG. 14A, the static contact angle for the flat structure with *Tropaeolum* wax film was 112°, but increased to 164° when *Tropaeolum* wax formed a nanostructure of tubules on it. For the microstructure, the static contact angle was 154°, but increases to 171° for the hierarchical surface structure.

Figure 14B:
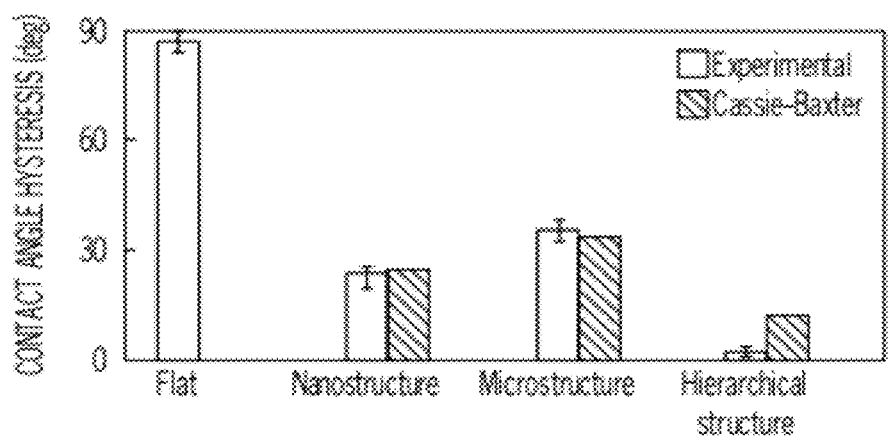
FIG. 14B is a graphical illustration comparing the superhydrophobicity of a flat structure, a nanostructures, a microstructure, and a hierarchical structure based on contact angle hysteresis according to one or more embodiments of the present invention.
Figure 14C:
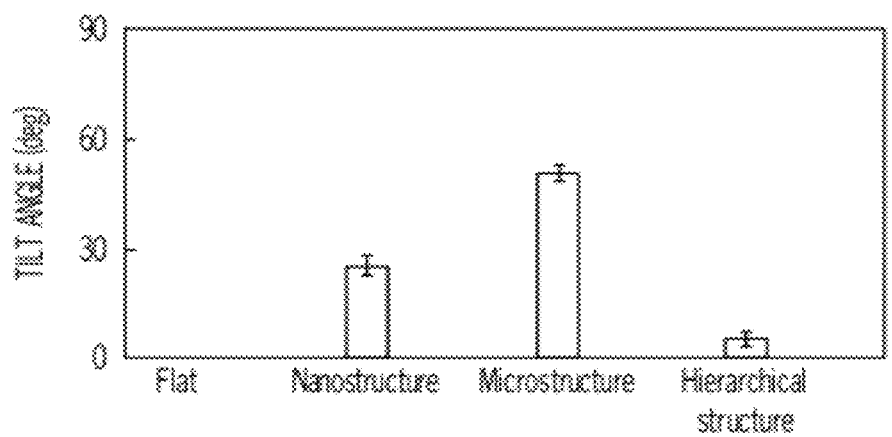
FIG. 14C is a graphical illustration comparing the superhydrophobicity of a flat structure, a nanostructures, a microstructure, and a hierarchical structure based on tilt angle according to one or more embodiments of the present invention.

Referring to FIGS. 14B and 14C, the contact angle hysteresis and tilt angle for flat, microstructure and nanostructure surfaces show similar trends. The flat surface showed a contact angle hysteresis angle of 61° and a tilt angle of 86°. The microstructure surface shows a reduction of contact angle hysteresis and tilt angles, but a water droplet still needs a tilt angle of 31° before sliding. Due to the addition of tubules formed on the flat and microstructure surfaces, the nanostructure and hierarchical structure surfaces, respectively, have static contact angles of 164° and 171°, respectively, and low hysteresis of 5° and 3°, respectively, thereby fulfilling the criteria for superhydrophobic and self-cleaning surfaces.

Figure 14D:
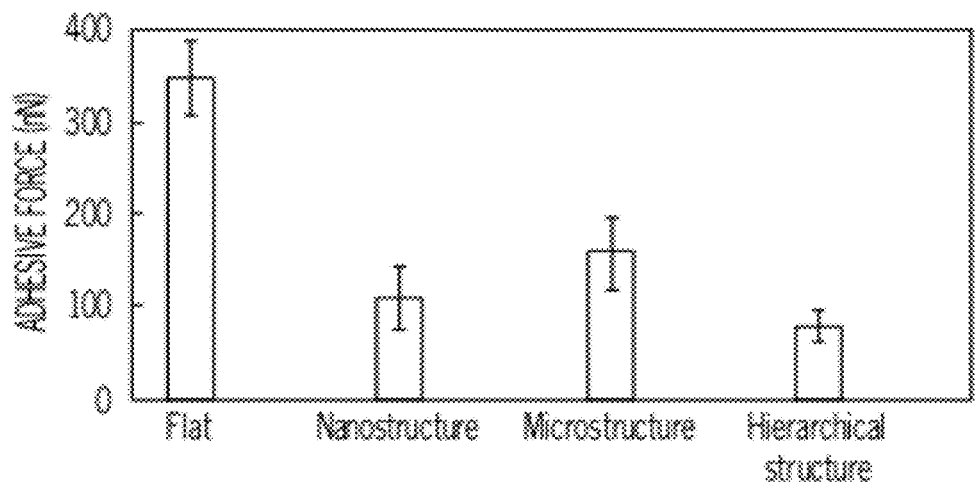
FIG. 14D is a graphical illustration comparing the superhydrophobicity of a flat structure, a nanostructures, a microstructure, and a hierarchical structure based on adhesive force according to one or more embodiments of the present invention.

Referring to FIG. 14D, the adhesive force, which was measured using a 15 µm radius borosilicate tip in an atomic force microscope (AFM), also showed similar trends as the wetting properties. As shown, the adhesion force of the hierarchical surface structure was lower than either that of microstructured and nanostructured surfaces, because the contact between the tip and surface was lower as a result of contact area being reduced in both levels of structuring.

In order to identify propensity of air pocket formation for the four structures, roughness factor ($R_f$) and fractional liquid-air interface ($f_{LA}$) are needed. Superhydrophobicity is usually caused by high surface roughness. The roughness is characterized by the non-dimensional Wenzel roughness factor, $R_f$, which is equal to the ratio of surface area to its flat projection. The $R_f$ for the nanostructure, $(R_f)_{nano}$, was calculated using the AFM map. The calculated results were reproducible within ±5%. The $R_f$ for the microstructure was calculated for the geometry of flat-top, cylindrical pillars of diameter D, height H, and pitch P distributed in a regular square array. For this case, roughness factor for the microstructure was calculated using the following equation, $$(R_f)_{micro} = \left(1 + \frac{\pi DH}{P^2}\right).$$

The roughness factor for the hierarchical structure is the sum of the roughness values for microstructure and nanostructure $(R_f)_{micro}$ and $(R_f)_{nano}$.

For calculation of $(f_{LA})$ we make the following assumptions. For the microstructure, we consider that a droplet in size much larger than the pitch P contacts only the flat-top of the pillars in the composite interface, and the cavities are filled with air. For the nanostructure, only the higher crystals are assumed to come in contact with a water droplet. For microstructure, the fractional flat geometric area of the solid-liquid and liquid-air interfaces $(f_{LA})_{micro}$ was calculated with the following equation, $$(f_{LA})_{micro} = \left(1 + \frac{\pi D^2}{4P^2}\right).$$

The fractional geometrical area of the top surface for the nanostructure was calculated from an SEM micrograph with top view (0° tilt angle). The fractional geometrical area of the top surface with *Tropaeolum* wax was found to be 0.14, leading to $f_{LA}$ of 0.86. For the hierarchical structure, the fractional flat geometrical area of the liquid-air interface is defined by $$(f_{LA})_{hierarchical} = \left(1 + \frac{\pi D^2}{4P^2}\right)[1 - (f_{LA})_{nano}].$$

The values calculated for the various structures are summarized in Table 1 below.

TABLE 1

| | $R_f$ | $f_{LA}$ | Contact angle (°) | Contact angle hysteresis (°) |
|---|---|---|---|---|
| Flat | | | 112 | 61 |
| Nanostructure | 11 | 0.86 | 164 | 5 |
| Microstructure | 3.5 | 0.71 | 154 | 27 |
| Hierarchical | 14.5 | 0.96 | 171 | 3 |

The roughness factor $(R_f)$ and fractional liquid-air interface $(f_{LA})$ of the hierarchical structure are higher than those of the nanostructures and microstructures, thus demonstrating that the air pocket formation in hierarchical structured surfaces occurs at both levels of structuring, which decreases the solid-liquid contact and thereby contact angle hysteresis and tilt angle.

Example 5

To further verify the effect of hierarchical structure on propensity of air pocket formation, evaporation experiments with a droplet on microstructure and hierarchical structure were conducted. The hierarchical structure included a nanostructure fabricated with 0.8 μg/mm² mass of *Tropaeolum* wax with ethanol vapor at 50° C. FIGS. 10A through 10F are successive SEM images taken 60 seconds apart of a droplet evaporating on a microstructure, whereas FIGS. 11A through 11F are successive SEM images taken 60 seconds apart of a droplet evaporating on a hierarchical structure. For the microstructure surface as shown in FIGS. 10A through 10F, the light passes below the droplet and air pockets can be seen, thus the droplet is in the Cassie-Baxter wetting regime. When the radius of the droplet decreases to 425 μm, the air pockets are not visible anymore and the droplet is in Wenzel wetting regime. This transition results from an impalement of the droplet in the patterned surface, characterized by smaller contact angle. For the hierarchical structure as shown in FIGS. 11A through 11F, the air pocket was clearly visible at the bottom area of the droplet throughout and the droplet was in a hydrophobic state until the droplet evaporated completely. Consequently, a hierarchical structure with nanostructures prevents the droplets from filling the gaps between the pillars.

Figure 13:
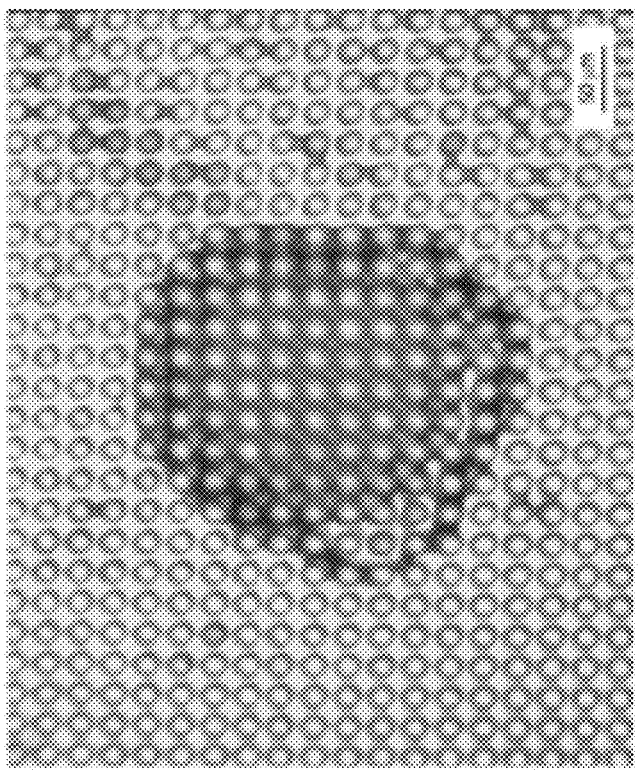
FIG. 13, in contrast to FIG. 12, is an SEM image illustrating a dirt stain on top of a surface with a hierarchical structure after a droplet of dirt evaporates according to one or more embodiments of the present invention.
Figure 12:
FIG. 12 is an SEM image illustrating a dirt stain embedded in a surface with only microasperities after a droplet of dirt evaporates.

FIGS. 12 and 13 provide a further contrast of microstructure surfaces (FIG. 12) and hierarchical surfaces (FIG. 13). When a droplet of 1 mm radius was placed on a microstructure surface and then evaporated, the dust particles became embedded into the microstructure surface in the spacing between microasperities as shown in FIG. 12. When the droplet was placed on a hierarchical structure, the dust particles do not become embedded in the hierarchical structure due to the droplet sinking into the spacing between nanoasperities.

Example 6

Figure 15:
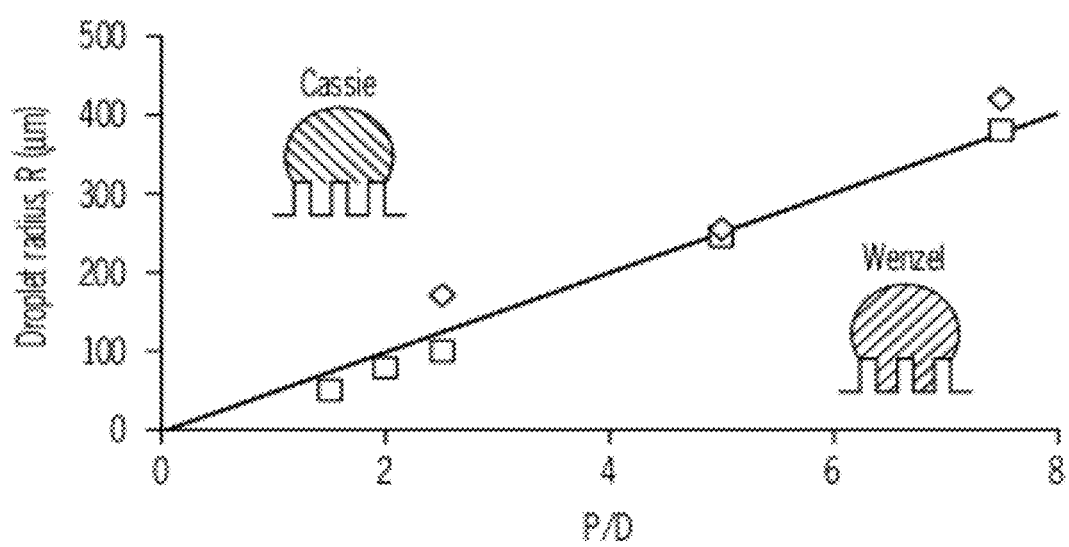
FIG. 15 is a graphical illustration illustrating that the relationship between the ratio P/D and the transition between Cassie and Wenzel wetting regimes according to one or more embodiments of the present invention.
Figure 16A:
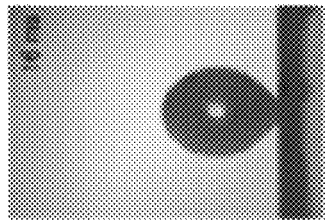
FIGS. 16A-16F are successive photographs taken at 8 ms intervals which illustrate the bouncing/and/or sticking of a droplet with a radius of 1 mm and a velocity of 0.44 m/s according to one or more embodiments of the present invention.
Figure 16B:
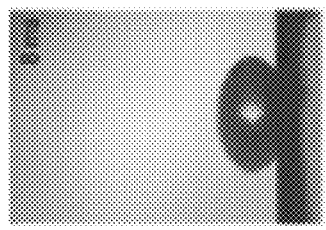
Figure 16C:
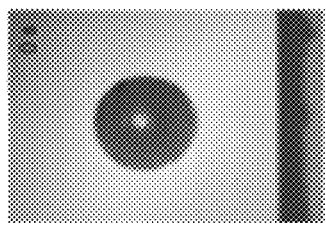
Figure 16D:
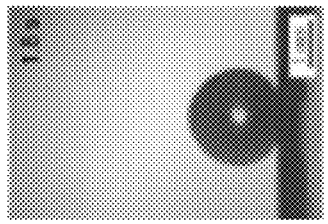
Figure 16E:
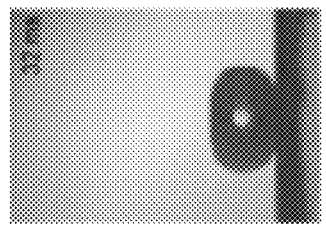
Figure 16F:
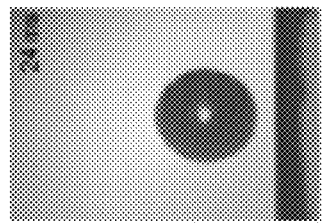
Figure 17C:
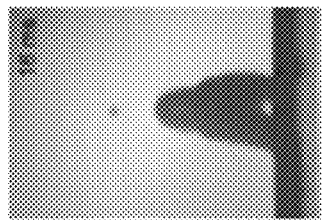
FIGS. 17A-17F, in contrast to FIGS. 16A-16F, are successive photographs taken at 8 ms intervals which illustrate the bouncing/and/or sticking of a droplet with a radius of 1 mm and a velocity of 0.88 m/s according to one or more embodiments of the present invention.
Figure 17F:
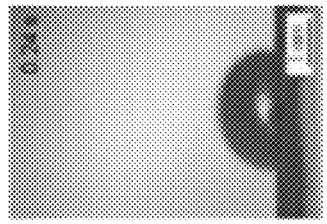
Figure 17B:
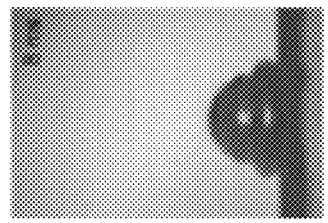
Figure 17E:
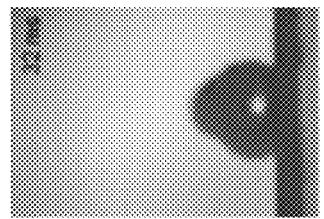
Figure 17A:
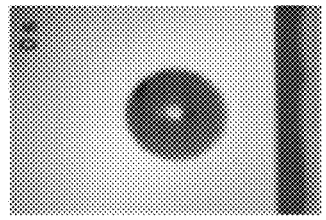
Figure 17D:
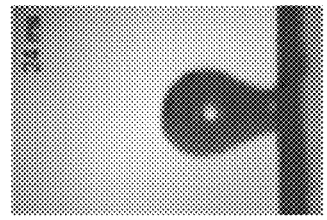

To demonstrate the energy transition due to an impacting droplet on a hierarchical surface, additional experiments were conducted. The two series of patterned Si surfaces, covered with a monolayer of hydrophobic tetrahydroperfluorodecyltrichlorosilane (contact angle with a nominally flat surface, $\theta_0=109°$, advancing and receding contact angle $\theta_{adv0}=116°$ and $\theta_{rec0}=82°$), formed by flat-top cylindrical pillars. Series 1 had pillars with the diameter D=5 μm, height H=10 μm, and pitch values P (7, 7.5, 10, 12.5, 25, 37.5, 45, 60, and 75) μm, while series 2 had D=14 μm, H=30 μm, P=(21, 23, 26, 35, 70, 105, 126, 168, and 210) μm. The two series were designed in this manner to isolate the effect of the pitch, pitch-to-height, and pitch-to-diameter ratios. The contact angle and contact angle hysteresis of millimeter-sized water drops upon the samples were measured. Referring to the graph on FIG. 15, it was found that for small P, the drops were in the Cassie state sitting on top of the pillars, whereas with increasing P the transition to the Wenzel state occurred. The transition to the Wenzel state occurred when the drop radius decreased below a certain critical value. The drop radius, R, at the Cassie-Wenzel transition was found to be proportional to P/D. Consequently, the energy barrier ΔE, which for cylindrical flat-top pillars, has the following equation $$\Delta E = A_0 \frac{\pi HD}{P^2}(\gamma_{LV}\cos\theta_0)$$

is proportional to the RD/P or RH/P. Since the area under the drop $A_0=\pi(R \sin \theta)^2$, taking $\sin^2\theta=0.1$, $\cos \theta_0=\cos 109°=-0.33$, $\gamma_{LV}=0.072$ J/m² and the observed value RD/P=50 μm yields ΔE=1.2×10⁻¹⁰ J. This quantity can be associated with the vibrational energy of the drop due to surface waves, etc.

Example 7

Figure 18:
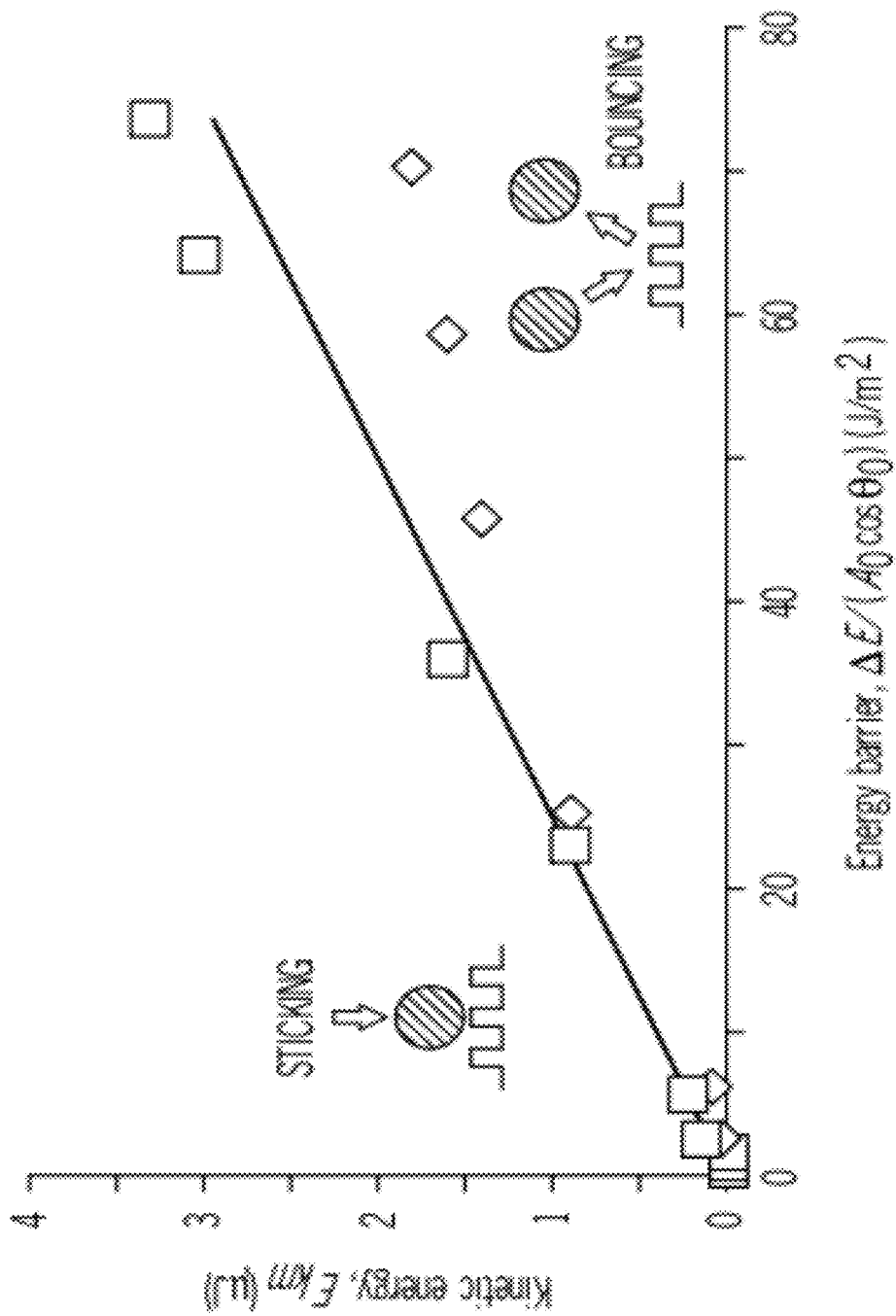
FIG. 18 is a graphical illustration illustrating how the kinetic energy of a drop impacts the transition between Cassie and Wenzel wetting regimes and the ability of a droplet to stick or bounce on a surface according to one or more embodiments.

The impact of water drops with 5 μL volume (about 1 mm radius) was also conducted upon hierarchical surfaces. Drops impacting the surface with low velocity bounce off the surface as shown in FIGS. 16A-16F, whereas those having high impact velocity stuck to the surface as shown in FIGS. 17A-17F. Sticking was associated with being in the Wenzel state with a large solid-liquid contact area, while the drops that bounced off the surface were in the Cassie state with an air pocket under them. Thus, the energy barrier of the Cassie-Wenzel transition can be estimated as the kinetic energy of the drops. The graph of FIG. 18 shows the dependence of the kinetic energy corresponding to the transition, $E_{kin}$, on $\Delta E/(A_0 \cos \theta_0)$. It is observed that the dependence is close to linear, however, the series of smaller pillars has larger energies of transition. The value of $A_0$ is in the range $0.11$ mm$^2$<$A_0$<$0.18$ mm$^2$ for Series 1 and $0.05$ mm$^2$<$A_0$<$0.11$ mm$^2$ for Series 2, which is of the same order as the actual area under the drop.

These results show that the energy barrier for the Cassie-Wenzel transition is proportional to the area under the drop. For drops sitting on the surface or evaporating, the transition takes place when the size of the barrier decreases to the value of the vibrational energy, approximately $E_{vib}=10^{-10}$ J, which was estimated from the energy barrier. This may happen because the size of the drop is decreased, or because the pitch between the pillars that cover the surface is increased. A different way to overcome the barrier is to hit the surface by a drop with a certain kinetic energy.

It is further noted that terms like "preferably," "generally", "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

All documents cited in the Detailed Description are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of making superhydrophobic structures comprising:
   depositing a polymer mold onto a silicon surface comprising a plurality of microasperities;
   removing the polymer mold after the polymer mold has hardened;
   depositing a liquid epoxy resin into the polymer mold;
   forming a microstructure with a plurality of microasperities by separating the epoxy resin from the mold after the epoxy resin has solidified; and
   forming a superhydrophobic structure by depositing a plurality of alkane nanoasperities on the microstructure in the presence of solvent vapor.

2. The method of claim 1 wherein the alkanes are n-hexatriacontane, alkanes of *tropaeolum* wax, alkanes of *leymus* wax, or combinations thereof.

3. The method of claim 2 wherein *leymus* wax is deposited in the presence of a solvent vapor comprising chloroform.

4. The method of claim 2 wherein the *tropaeolum* wax is deposited in the presence of a solvent vapor comprising ethanol.

5. The method of claim 1 wherein the microasperities formed by the polymer mold comprise epoxy resin, silicon, or combinations thereof.

6. The method of claim 1 wherein the nanoasperities comprise tubules, platelets, or combinations thereof.

7. The method of claim 1 wherein the plurality of nanoasperities are arranged in a geometric pattern, a random pattern, or combinations thereof.

8. The method of claim 1 wherein the plurality of nanoasperities are disposed on the microasperities, on the substrate in the spacing between adjacent microasperities, or combinations thereof.

9. The method of claim 1 wherein the plurality of microasperities comprise a height H of between about 1 to about 100 µm, a diameter D of between about 1 to about 50 µm, and a pitch P of the microasperities is between 1 and 500 µm, and the plurality of nanoasperities comprise a height h of between about 1 to about 100 nm and a diameter d of between about 1 to about 300 nm.

10. The method of claim 1 wherein the arrangement of microasperities on the microstructure defines the following relationship $(\sqrt{2}P-D)^2/R < H$, wherein P is the pitch of the microasperities, D is the diameter of the microasperities, H is the height of the microsaperities, and R is the roughness factor.

11. The method of claim 1 wherein the fraction of the surface area of the substrate covered by the microasperities is from between about 0.5 to about 1.

12. The method of claim 1 wherein the fraction of the surface area of the substrate covered by the microasperities is from between about 0.8 to about 1.

13. The method of claim 1 wherein the superhydrophobic structure comprises a contact angle of between about 150° to about 180°.

14. The superhydrophobic structure of claim 1 wherein the superhydrophobic structure comprises a contact angle of between about 165° to about 180°.

15. The superhydrophobic structure of claim 1 wherein the superhydrophobic structure comprises a contact angle hysteresis of between about 0° to about 10°.

16. The method of claim 1 wherein the superhydrophobic structure defines a contact angle hysteresis of between about 0° to about 5°.

* * * * *